(12) United States Patent
Griffith et al.

(10) Patent No.: US 6,583,526 B2
(45) Date of Patent: *Jun. 24, 2003

(54) GENERATOR STATOR CORE VENT DUCT SPACER POSTS

(75) Inventors: John Wesley Griffith, Schenectady, NY (US); Wei Tong, Clifton Park, NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,160

(22) Filed: Oct. 19, 1999

(65) Prior Publication Data

US 2003/0048030 A1 Mar. 13, 2003

(51) Int. Cl.[7] .................................................. H02K 9/00
(52) U.S. Cl. .......................................... 310/58; 310/65
(58) Field of Search ............................. 310/52, 58, 59, 310/60 R, 60 A, 65, 254; 29/596–598

(56) References Cited

U.S. PATENT DOCUMENTS

| | | | | |
|---|---|---|---|---|
| 831,625 A | * | 9/1906 | McElroy | 310/65 |
| 933,737 A | * | 9/1909 | Baird | 310/65 |
| 3,597,645 A | * | 8/1971 | Duffert et al. | 310/54 |
| 4,061,937 A | * | 12/1977 | Goel et al. | 310/65 |
| 4,362,960 A | * | 12/1982 | Gillet | 310/65 |
| 5,869,912 A | * | 2/1999 | Andrew et al. | 310/65 |

OTHER PUBLICATIONS

"39th GE Turbine State–of–the–Art Technology Seminar", Tab 1, ""F"Technology–the First Half–Million Operating Hours", H.E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A. S. Arrao, Aug. 1996.

"39th GE Turbine State–of–the–Art Technology Seminar", Tab 4, "MWS6001FA –An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines –Design and Operating Features", M.W. Horner, Aug. 1996.

"39th GE Turbine–State–of–the–Art Technology Seminar", Tab 7, "Advance Gas Turbine Materials and Coatings", P.W. Schilke, Aug. 1996.

(List continued on next page.)

*Primary Examiner*—Tran Nguyen
(74) *Attorney, Agent, or Firm*—Nixon & Vanderhye P.C.

(57) ABSTRACT

Generator stator cores are constructed by stacking many layers of magnetic laminations. Ventilation ducts may be inserted between these layers by inserting spacers into the core stack. The ventilation ducts allow for the passage of cooling gas through the core during operation. The spacers or spacer posts are positioned between groups of the magnetic laminations to define the ventilation ducts. The spacer posts are secured with longitudinal axes thereof substantially parallel to the core axis. With this structure, core tightness can be assured while maximizing ventilation duct cross section for gas flow and minimizing magnetic loss in the spacers.

18 Claims, 2 Drawing Sheets

OTHER PUBLICATIONS

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M.A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R.C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J.F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency", Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website of PowerGen Europe" Jun. 1–3 going public Jun. 15, (1995).

"New Steam Cooling System is a Key to 60% Efficiency for GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy. A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Flourescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Applications," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Flourescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPI's Combustion Turbine Program: Status and Future Directions", Arthur Cohn, pp. 535–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine–High Efficiency, Low Cost of Electricity and Low Emissions", Roger Schonewald and Patrick Marolda, (no date available).

"Testing Program Results Validate GE's H Gas Turbine–High Efficiency, Low Cost of Electricity and Low Emissions", Slide Presentation–working draft, (no date available).

"The Next Step in H . . . For Low Cost Per kW–Hour Power Generation", LP–1 PGE'98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Numbers: DOE/MC/31176—5340.

"Utility Advanced Turbine System (ATS) Technology Readiness Testing and Pre–Commercial Demonstration–Phase 3", Document #486132, Apr. 1 –Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos. DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing–Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

\* cited by examiner

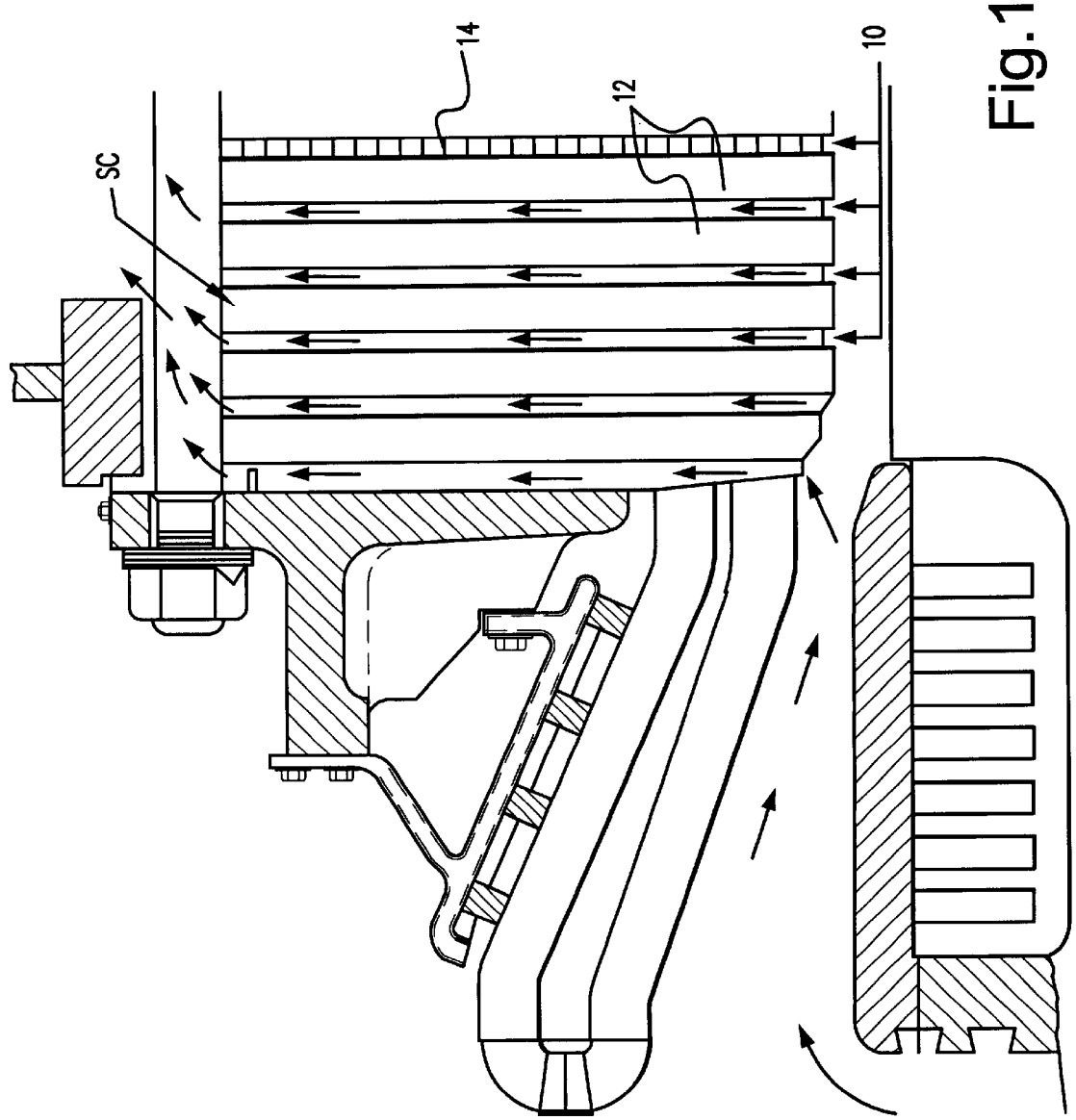

GENERATOR STATOR CORE VENT DUCT SPACER POSTS

This invention was made with Government support under Contract No. DE-FC21-95MC-31176 awarded by the Department of Energy. The Government has certain rights in this invention.

BACKGROUND OF THE INVENTION

The present invention relates to generator stator core ventilation ducts and, more particularly, to ventilation duct spacer posts inserted between magnetic laminations of a generator stator core.

During normal generator operation, heat is generated in the copper conductors and the steel core due to the copper and steel losses. To ensure generator reliable performance, the generated heat must be removed efficiently. Conventionally, heat is removed from copper conductors to the steel core, which is cooled by forced-convection flows (air or hydrogen gas), through ventilation ducts between steel laminates, radial stator ducts, and the rotor-stator annular gap.

Generator stator cores are constructed by stacking many layers of magnetic laminations. The ventilation ducts may be inserted between groups of layers by including spacers such as rails into the core stack, which allow for the passage of cooling gas through the core during operation. These spacers must be positioned in such a way to assure tightness of the core during assembly and operation. Additionally, they must not block or restrict the flow of gas through the stator, which would result in temperatures exceeding normal operating temperatures, thereby reducing efficiency. These spacers are subjected to the same magnetic field as the magnetic core and must not introduce excessive heat loss.

BRIEF SUMMARY OF THE INVENTION

Spacers for ventilation ducts between generator stator core magnetic laminations should be configured to assure core tightness while maximizing the ventilation duct cross section so as not to block or restrict the flow of gas through the stator and while minimizing magnetic loss in the spacers. As a consequence, the life of the generator can be extended while increasing operating efficiency, and thereby increasing generator output rating.

In an exemplary embodiment the invention, a ventilation duct in a generator stator core having a core axis and including a plurality of layers of magnetic laminations is defined by spacer posts disposed between groups of the magnetic laminations. The spacer posts are secured with longitudinal axes thereof substantially parallel to the core axis. The spacer posts may be press fit with at least one of the magnetic laminations and may be formed of a non-magnetic alloy or carbon steel. In a preferred arrangement, the spacer posts are arranged in triangle arrays or staggered rows or the like. Preferably, the spacer posts have a cylindrical shape. In one embodiment, the spacer posts are secured to the tooth tip corners of the magnetic laminations. The ventilation duct may further be defined by radially oriented rails disposed between the groups of the magnetic laminations. In this context, the spacer posts are secured to the tooth tip corners.

In another exemplary embodiment of the invention, a generator stator core having a core axis includes a plurality of layers of magnetic laminations, and a plurality of ventilation ducts defined by spacer posts disposed between groups of the magnetic laminations. The spacer posts are secured with longitudinal axes thereof substantially parallel to the core axis.

BRIEF DESCRIPTION OF THE DRAWINGS

FIG. 1 is a side elevational view of a typical generator construction;

DETAILED DESCRIPTION OF THE INVENTION

Figure 3:
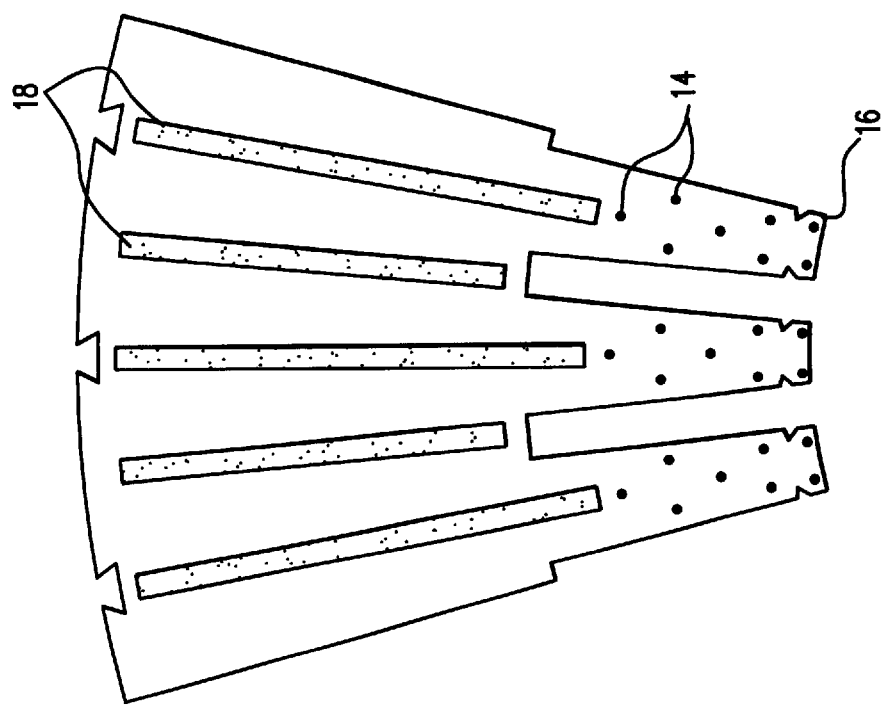
FIG. 3 is a plan view of a ventilation duct according to a second embodiment of the invention.

FIG. 1 illustrates a typical generator construction. The generator stator core SC is constructed by stacking layers of magnetic laminations. Ventilation ducts 10 are provided between respective groups of laminations 12 and are defined by vent duct spacers 14 disposed between the respective groups 12 of laminations. Each group 12 of magnetic laminations may include 100 or more of the magnetic laminations.

Figure 2:
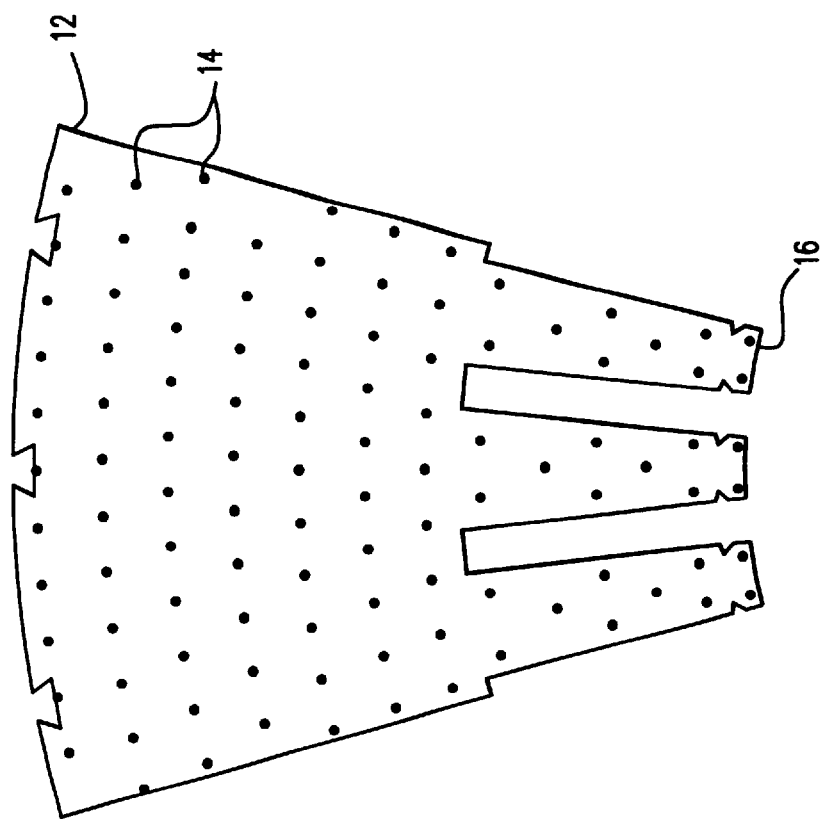
FIG. 2 is a plan view of a ventilation duct according to a first embodiment of the invention.

FIG. 2 is a plan view of a ventilation duct according to a first embodiment of the invention. The illustrated magnetic lamination 12 is thus the last magnetic lamination in a group of magnetic laminations adjacent the ventilation duct 10.

Each of the ventilation ducts 10 is defined by a plurality of spacer posts disposed between groups of the magnetic laminations 12. The spacer posts 14 are preferably secured with their longitudinal axes substantially parallel to the core axis. Because the spacer post axes are in the core axial direction, in contrast with the conventional rail spacers disposed in the radial direction, the spacer posts 14 will be less magnetized, thereby maximizing machine efficiency. The spacer posts 14, as shown in FIG. 2, are preferably placed at equal distances over a facing lamination and fastened in place. The posts may be fastened in any suitable manner, such as by being press fit into self-formed or pre-formed holes or detents in the lamination, by being spot-welded to the lamination, by being secured with nails from a nail gun or the like, etc. Preferably, however, the spacer posts 14 are secured to only one side of the ventilation duct 10, with a friction contact with the facing lamination.

The spacer posts 14 are preferably formed of carbon steel or non-magnetic alloys as desired for ease of assembly. Of course, those of ordinary skill in the art will contemplate other suitable materials, and the invention is not meant to be limited to the described materials. Additionally, the spacer posts are preferably of a cylindrical shape, but other shapes such as rectangle, air foil, or the like, may also be suitable.

With continued reference to FIG. 2, the spacer posts 14 are preferably arranged in triangle arrays or staggered rows. As cooling flow passes the spacer posts, horseshoe vortices are generated in the stagnation area by virtue of the staggered spacer arrangement, and the flow separates in the wake of the spacers. The horseshoe vortices increase heat transfer. In the wakes of the spacers, heat transfer is low. The horseshoe vortices appear in front of each spacer and influence the flow structure on a large area of the flow channel wall. The staggered arrangement of the spacers reduces the size of their wakes, thus tending to reduce the low local heat transfer in these regions. As such, the spacers serve as turbulence promoters to enhance heat transfer. The combination of the increased heat transfer coefficient and enlarged flow area considerably improves heat convection in the flow channel, thereby reducing or even eliminating hot spots.

These hot spots typically appear near the tooth tip corners 16 of the magnetic laminations 12. Because of the ease of placement of the posts, the spacer posts 14 can be applied directly to the tooth tip corners 16, thus reinforcing this critical area to assure core tightness. Currently, wedges are used to support the tooth tip corners. Unsupported tooth tip corners would result in loose laminations, causing vibrations that would thereby reduce the life of the machine. With the spacer posts 14 according to the invention, wedges for the tooth tip corners are not necessary. Moreover, the spacer posts can be positioned so as to avoid the stator wedge dovetail cross section. In this section, the ventilation duct gas flow is typically at a minimum. As a consequence, the cross sectional area in the ventilation duct available for the cooling gas is maximized.

In a second embodiment of the invention, illustrated in FIG. 3, the spacer posts 14 according to the invention can be used in combination with radially oriented space block rails 18 of the conventional construction. In this context, for example, the spacer posts 14 may be applied only to the tooth tip corners 16, with the conventional radial rails 18 used in the remaining parts of the core. This combination allows for realization of the majority of the advantages of the present invention with little change in tooling or procedure from the present facilities.

With the structure according to the present invention, the ventilation ducts in a generator stator core can be configured with a maximum area for cooling gas flow while assuring core tightness and minimizing magnetic losses in the spacers. As a consequence, operating efficiency of the generator is increased and the life of the generator is extended, thereby increasing the generator output rating.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A ventilation duct in a generator stator core having a core axis and including a plurality of layers of magnetic laminations, the ventilation duct being defined by spacer posts disposed between groups of the magnetic laminations in contact with facing surfaces of adjacent magnetic laminations, wherein the spacer posts are secured with longitudinal axes thereof substantially parallel the core axis.

2. A ventilation duct according to claim 1, wherein the spacer posts are press fit with at least one of the magnetic laminations.

3. A ventilation duct according to claim 1, wherein the spacer posts are formed of a non-magnetic alloy.

4. A ventilation duct according to claim 1, wherein the spacer posts are formed of carbon steel.

5. A ventilation duct according to claim 1, wherein the spacer posts are arranged in triangle arrays.

6. A ventilation duct according to claim 1, wherein the spacer posts are arranged in staggered rows.

7. A ventilation duct according to claim 1, wherein the spacer posts have a cylindrical shape.

8. A ventilation duct according to claim 1, wherein the layers of magnetic laminations include tooth tip corners, and wherein the spacer posts are secured to the tooth tip corners.

9. A ventilation duct according to claim 1, wherein the ventilation duct is further defined by radially oriented rails disposed between the groups of the magnetic laminations.

10. A ventilation duct according to claim 9, wherein the layers of magnetic laminations include tooth tip corners, and wherein the spacer posts are secured to the tooth tip corners.

11. A generator stator core having a core axis and comprising:
    a plurality of layers of magnetic laminations; and
    a plurality of ventilation ducts defined by spacer posts disposed between groups of the magnetic laminations in contact with facing surfaces of adjacent magnetic laminations, the spacer posts being secured with longitudinal axes thereof substantially parallel to the core axis.

12. A generator stator core according to claim 11, wherein the spacer posts are arranged in triangle arrays.

13. A generator stator core according to claim 11, wherein the spacer posts are arranged in staggered rows.

14. A generator stator core according to claim 11, wherein the spacer posts have a cylindrical shape.

15. A generator stator core according to claim 11, wherein each of the ventilation ducts is further defined by radially oriented rails disposed between the groups of the magnetic laminations.

16. A ventilation duct according to claim 15, wherein the layers of magnetic laminations include tooth tip corners, and Wherein the spacer posts are secured to the tooth tip corners.

17. A ventilation duct in a generator stator core having a core axis and including a plurality of layers of magnetic laminations, the ventilation duct being defined by spacer posts disposed between groups of the magnetic laminations, wherein the spacer posts are secured with longitudinal axes thereof substantially parallel the core axis, and wherein the spacer posts are arranged in triangle arrays.

18. A generator stator core having a core axis and comprising:
    a plurality of layers of magnetic laminations; and
    a plurality of ventilation ducts defined by spacer posts disposed between groups of the magnetic laminations, the spacer posts being secured with longitudinal axes thereof substantially parallel to the core axis, wherein the spacer posts are arranged in triangle arrays.

* * * * *